United States Patent
Yokoyama et al.

(10) Patent No.: US 8,679,243 B2
(45) Date of Patent: Mar. 25, 2014

(54) AQUEOUS PIGMENT DISPERSION USED FOR PREPARING INK JET RECORDING AQUEOUS INK, AND INK JET RECORDING AQUEOUS INK

(75) Inventors: Ryuji Yokoyama, Sakura (JP); Takao Ogihara, Sakura (JP); Kengo Yasui, Kamisu (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/883,476

(22) PCT Filed: Feb. 22, 2012

(86) PCT No.: PCT/JP2012/054209
§ 371 (c)(1),
(2), (4) Date: Sep. 25, 2013

(87) PCT Pub. No.: WO2012/115127
PCT Pub. Date: Aug. 30, 2012

(65) Prior Publication Data
US 2014/0011917 A1 Jan. 9, 2014

(30) Foreign Application Priority Data
Feb. 24, 2011 (JP) .................................. 2011-038296

(51) Int. Cl.
| | | |
|---|---|---|
| C09D 11/00 | (2006.01) | |
| C08K 5/3415 | (2006.01) | |
| C08K 5/3432 | (2006.01) | |
| C08L 33/08 | (2006.01) | |
| C08L 33/10 | (2006.01) | |
| C08L 75/04 | (2006.01) | |
| C09D 133/08 | (2006.01) | |
| C09D 133/10 | (2006.01) | |
| C09D 175/04 | (2006.01) | |

(52) U.S. Cl.
USPC .................... 106/31.65; 106/31.6; 106/31.77; 106/31.78; 106/31.86; 524/87; 524/89; 524/92; 524/94; 524/99; 524/102; 524/104; 524/105; 525/454; 525/455

(58) Field of Classification Search
USPC ............ 106/31.13, 31.6, 31.65, 31.75, 31.76, 106/31.77, 31.78, 31.85, 31.86; 524/86, 87, 524/89, 92, 94, 99, 102, 104, 105; 525/123, 525/454, 455
See application file for complete search history.

(56) References Cited

U.S. PATENT DOCUMENTS 6,057,449 A * 5/2000 Hendi ........................ 546/276.7
2007/0285458 A1* 12/2007 Nakahama et al. ............. 347/20

FOREIGN PATENT DOCUMENTS

| JP | 2000-191974 A | 7/2000 |
|---|---|---|
| JP | 2003-336001 A | 11/2003 |
| JP | 2004-155830 A | 6/2004 |
| JP | 2004-217916 A | 8/2004 |
| JP | 2007-186681 A | 7/2007 |

OTHER PUBLICATIONS

Machine translation of JP 2007-186681, provided by the JPO website (no date).*
Intenational Search Report for PCT/JP2012/054209, Mailing Date of May 29, 2012.

* cited by examiner

Primary Examiner — Michael J Feely
(74) Attorney, Agent, or Firm — Westerman, Hattori, Daniels & Adrian, LLP

(57) ABSTRACT

An aqueous pigment dispersion used for preparing an ink jet recording aqueous ink comprises an anionic group-containing organic polymeric compound, an organic pigment, an organic pigment derivative, and the water, wherein the polymeric compound, the organic pigment, and the organic pigment derivative are dispersed in water, the organic pigment and the organic pigment derivative are a diketopyrrolopyrrole-based red pigment and a phthalimidoalkylated quinacridone, respectively, and the phthalimidoalkylated quinacridone content is in the range of 1.6 to 3.8% relative to the total (100%) of the diketopyrrolopyrrole-based red pigment and the phthalimidoalkylated quinacridone on a mass basis. Furthermore, there is provided an ink jet recording aqueous ink containing such an aqueous pigment dispersion, wherein the aqueous pigment dispersion is diluted such that the total of the organic pigment content and the organic pigment derivative content is from 1 to 8% on a mass basis.

5 Claims, 1 Drawing Sheet

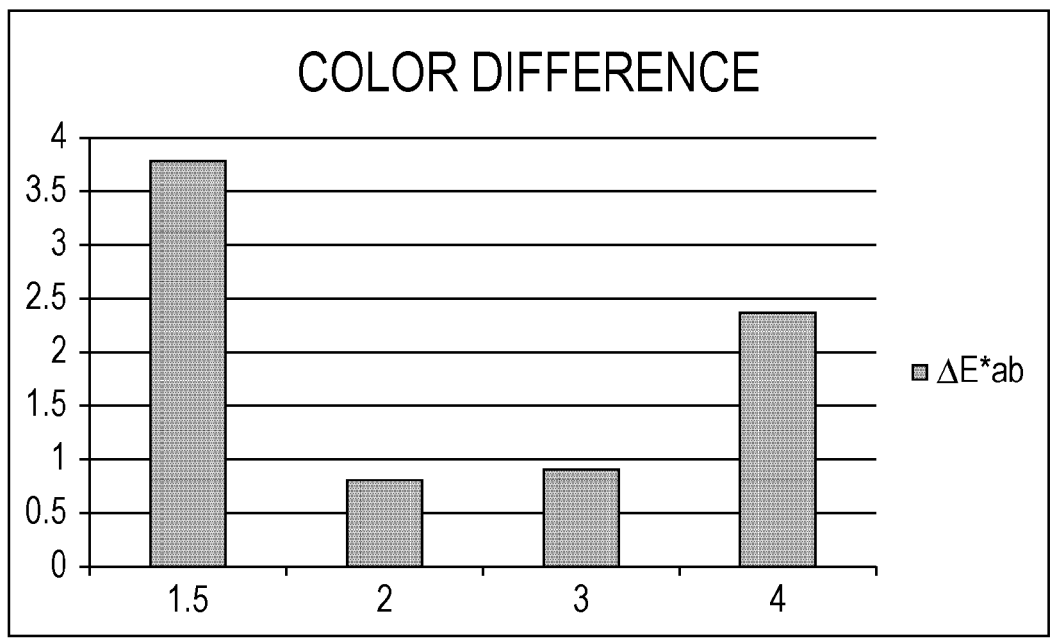

AQUEOUS PIGMENT DISPERSION USED FOR PREPARING INK JET RECORDING AQUEOUS INK, AND INK JET RECORDING AQUEOUS INK

TECHNICAL FIELD

The present invention relates to an aqueous pigment dispersion that is suitable for full-color printing with at least four colors of Y (yellow), M (magenta), C (cyan), R (red), that exhibits excellent storage stability, and that is used for preparing an ink jet recording aqueous ink of R (red) color that is an extra color (referred to as "additional color" where appropriate). The present invention also relates to an ink jet recording aqueous ink.

BACKGROUND ART

Ink jet printing systems enable reductions in noise and running costs. In addition, high-quality images can be formed even with an apparatus having a simple structure, and various types of inks can be used for printing; thus, ink jet printing systems have been increasingly used in a wide range of fields.

In particular, ink jet recording inks have come into significantly wide use by general consumers; among such inks, aqueous inks that are excellent in terms of nature conservation and environmental protection and that exhibit high safety in use are used. Since the fastness of printed articles, such as weather (light) resistance and water resistance, is considered important, pigments have come to be used as colorants.

Aqueous inks produced with pigments of three primary colors of Y, M, and C, however, exhibit a narrow color reproduction range as compared with aqueous inks containing dyes, which is problematic. There has been an approach to overcoming this problem, in which red (R), green (G), blue (B), orange (O), and violet (V) inks (inks of extra colors) containing colorants having different hues from the three primary colors are additionally used to enlarge a color reproduction range. This approach involves use of a red ink that is an aqueous ink containing C. I. Pigment Red 254 as a pigment and use of an ink set including such a red ink (Patent Literature 1).

C. I. Pigment Red 254 itself, however, has poor dispersibility on media which need to be colored; in addition to such poor dispersibility, C. I. Pigment Red 254 is less likely to exhibit good storage stability, such as no hue change or little change in a dispersed particle size, at high temperature for a long period especially when dispersed in water. These properties are problematic.

CITATION LIST

Patent Literature

Patent Literature 1: Japanese Unexamined Patent Application Publication No. 2004-155830

SUMMARY OF INVENTION

Problems to be Solved by the Invention

It is an object of the present invention to provide an aqueous pigment dispersion used for preparing an ink jet recording aqueous ink of red (R) color that is an extra color, the aqueous pigment dispersion exhibiting no hue change and little change in a dispersed particle size, namely, having excellent storage stability. It is another object of the present invention is to provide an ink jet recording aqueous ink.

Means for Solving the Problems

The inventors have carried out intensive studies and obtained the following finding to accomplish the present invention: an ink jet recording aqueous ink which does not have the above-mentioned problem can be produced by using a diketopyrrolopyrrole-based red pigment in combination with phthalimidoalkylated quinacridone within a predetermined content range, especially by using an aqueous pigment dispersion in which both the components are dispersed in water.

In particular, the present invention provides an aqueous pigment dispersion used for preparing an ink jet recording aqueous ink, the aqueous pigment dispersion containing an anionic group-containing organic polymeric compound, an organic pigment, an organic pigment derivative, and water, wherein the polymeric compound, the organic pigment, and the organic pigment derivative are dispersed in the water, the organic pigment and the organic pigment derivative are a diketopyrrolopyrrole-based red pigment (A) and a phthalimidoalkylated quinacridone (B), respectively, and the phthalimidoalkylated quinacridone (B) content is in the range of 1.6 to 3.8% relative to the total amount (100%) of the diketopyrrolopyrrole-based red pigment (A) and the phthalimidoalkylated quinacridone (B) on a mass basis.

Furthermore, the present invention provides an ink jet recording aqueous ink containing an aqueous pigment dispersion used for preparing an ink jet recording aqueous ink, wherein the aqueous pigment dispersion is diluted such that the total of the organic pigment content and the organic pigment derivative content is from 1 to 8% on a mass basis; the aqueous pigment dispersion contains an anionic group-containing organic polymeric compound, an organic pigment, an organic pigment derivative, and water, wherein the polymeric compound, the organic pigment, and the organic pigment derivative are dispersed in the water, the organic pigment and the organic pigment derivative are a diketopyrrolopyrrole-based red pigment (A) and a phthalimidoalkylated quinacridone (B), respectively, and the phthalimidoalkylated quinacridone (B) content is in the range of 1.6 to 3.8% relative to the total amount (100%) of the diketopyrrolopyrrole-based red pigment (A) and the phthalimidoalkylated quinacridone (B) on a mass basis.

Advantageous Effects of Invention

In the aqueous pigment dispersion of the present invention, a diketopyrrolopyrrole-based red pigment is used in combination with phthalimidoalkylated quinacridone within a predetermined content range, and the both components are dispersed in water, which gives a significantly large technical effect in which an ink jet recording aqueous ink exhibiting good storage stability, such as no hue change or little change in a dispersed particle size, at high temperature for a long period can be readily prepared.

The ink jet recording aqueous ink of the present invention contains an aqueous pigment dispersion prepared by using diketopyrrolopyrrole-based red pigment in combination with phthalimidoalkylated quinacridone within a predetermined content range such that the both components are dispersed in water. This gives a significantly large technical effect in which an ink jet recording aqueous ink exhibiting good storage stability, such as no hue change or little change in a dispersed particle size, at high temperature for a long period can be readily provided.

BRIEF DESCRIPTION OF DRAWING

FIG. 1 is a graph illustrating color differences between printed articles formed with inks of Examples 1 to 4 before storage of the inks and printed articles formed with these inks after storage of the inks.

DESCRIPTION OF EMBODIMENTS

The aqueous pigment dispersion of the present invention used for preparing an ink jet recording aqueous ink contains an anionic group-containing organic polymeric compound, an organic pigment, an organic pigment derivative, and water, wherein the polymeric compound, the organic pigment, and the organic pigment derivative are dispersed in the water, the organic pigment and the organic pigment derivative are a diketopyrrolopyrrole-based red pigment (A) and a phthalimidoalkylated quinacridone (B), respectively, and the phthalimidoalkylated quinacridone (B) content is in the range of 1.6 to 3.8% relative to the total amount (100%) of the diketopyrrolopyrrole-based red pigment (A) and the phthalimidoalkylated quinacridone (B) on a mass basis.

Diketopyrrolopyrrole-based pigments have the structure represented by the following general formula, a color ranging from red to orange, and excellent light resistance and thermal resistance. Examples of diketopyrrolopyrrole-based pigments include red pigments such as C. I. Pigment Red 254, 255, 264, and 272; and orange pigments such as C. I. Pigment Orange 71 and 73. In particular, a diketopyrrolopyrrole-based red pigment (A) [hereinafter referred to as red pigment (A)] is used as an essential component in the present invention. A preferred red pigment (A) is C. I. Pigment Red 254 in which each X in the following general formula is a chlorine atom bonded to the P (para) position.

[Chem. 1]

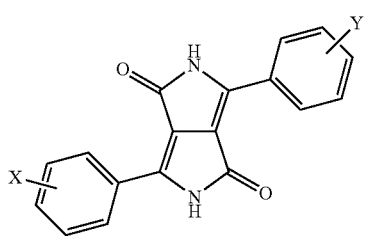

In the general formula, X may be the same or different and may be a hydrogen atom, a chlorine atom, a phenyl group, or a methyl group.

A diketopyrrolopyrrole-based red pigment having an average primary particle size of 100 to 150 nm is preferably used as the red pigment (A).

An average primary particle size is measured in the following manner. Particles in the visual field are captured with a transmission electron microscope or a scanning electron microscope. In 50 primary particles constituting an aggregate in the two-dimensional image, the largest inner diameter (largest length) of each particle is determined. The average value of the largest lengths of the individual particles is employed as the average primary particle size.

The phthalimidoalkylated quinacridone (B) [hereinafter referred to as derivative (B)] will now be described. The derivative (B) is a quinacridone in which at least one phthalimidoalkyl group is substituted for a hydrogen atom on the quinacridone ring and thus bonded to the quinacridone ring. A representative example of a phthalimidoalkyl group is a phthalimidomethyl group represented by the following formula.

[Chem. 2]

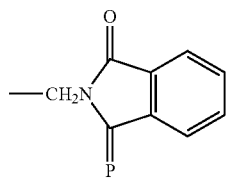

The phthalimidomethylated quinacridone is a quinacridone-based pigment derivative having a structure represented by the following general formula.

[Chem. 3]

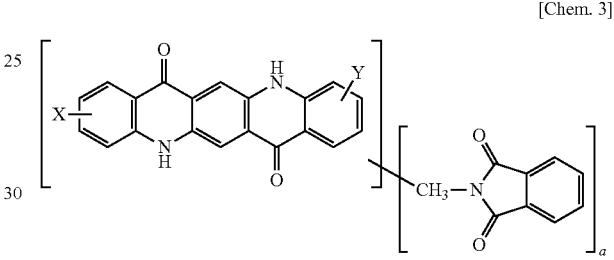

In the formula, X and Y may be the same or different and each may be a hydrogen atom, a methyl group, or a chlorine atom. The substitution number n of phthalimidomethyl groups is 1 to 3.

Examples of such a derivative (B) include phthalimidomethylated unsubstituted quinacridone, phthalimidomethylated dimethylquinacridone, and phthalimidomethylated dichloroquinacridone. These may be used alone or used as a mixture of two or more. In the case where C. I. Pigment Red 254 is employed as the red pigment (A), phthalimidomethylated dichloroquinacridone is preferably used as the derivative (B).

The derivative (B) can be readily produced through, for example, a reaction of a quinacridone-based red pigment with paraform and phthalimide or with hydroxymethylphthalimide in sulfuric acid (see, Japanese Unexamined Patent Application Publication No. 55-108466). A mixture of phthalimidomethylated quinacridone in which the substitution number of phthalimidomethyl groups is 1 to 3 and non-phthalimidated quinacridone-based red pigment may be used as the derivative (B). In this case, examples of the quinacridone-based red pigment include unsubstituted quinacridone pigments such as C. I. Pigment Violet 19, dimethylquinacridone pigments such as C. I. Pigment Red 122, and dichloroquinacridone pigments such as C. I. Pigment Red 202 and C. I. Pigment Red 209.

It is important that the aqueous pigment dispersion of the present invention used for preparing an ink jet recording aqueous ink contain the red pigment (A) and the derivative (B) such that the derivative (B) content is from 1.6 to 3.8% relative to the total (100%) of the red pigment (A) and the derivative (B) on a mass basis.

Simple composition in which the red pigment (A) and the derivative (B) may be used at any contents provided that the former is employed as the main component is not used. The inventors have newly found the following trade-off relationship: an attempt to reduce a hue change brought about crystal growth of the red pigment (A) in the aqueous pigment dispersion or an aqueous ink causes an increase in the size of particles dispersed in the aqueous pigment dispersion or the aqueous ink; on the other hand, an attempt to reduce a change in the size of the particles dispersed in the aqueous pigment dispersion or the aqueous ink causes an increase in a hue change brought about crystal growth of the red pigment (A) in the aqueous pigment dispersion or the aqueous ink.

In order to satisfy these requirements, the derivative (B) content is from 1.6 to 3.8%, preferably 1.8 to 3.5%, and especially preferably 2.0 to 3.0% relative to the total (100%) of the red pigment (A) and the derivative (B) on a mass basis. The content range of 1.6 to 3.8% is very narrow, but notable storage stability provided by the present invention cannot be achieved at a content that is smaller than the lower limit of that range and larger than the upper limit thereof.

The aqueous pigment dispersion of the present invention used for preparing an ink jet recording aqueous ink contains the anionic group-containing organic polymeric compound, the organic pigment, the organic pigment derivative, and water and can be prepared by dispersing the polymeric compound, organic pigment, and organic pigment derivative in the water.

In a well-known technique, solvent salt milling is carried out in the presence of both an organic pigment and an organic pigment derivative thereof to produce an organic pigment composition containing the organic pigment and organic pigment derivative; in general, an organic pigment derivative to be used has the same chemical structure as an organic pigment to be combined therewith. Such an organic pigment composition produced in this manner may be dispersed in water; however, in the present invention, the red pigment (A) and the derivative (B) having a different chemical structure from the red pigment (A) are not used and not brought into contact with each other before preparation of the aqueous pigment dispersion, which can readily provide an effect of the present invention and is therefore preferred.

In the above-mentioned solvent salt milling, the organic pigment derivative causes the organic pigment to have an unnecessarily fine structure with the result that the resulting fine organic pigment has high surface energy. The organic pigment itself therefore becomes much less likely to be dispersed in water, and color images formed with an ink jet recording aqueous ink prepared from an aqueous pigment dispersion to be consequently produced exhibit reduced density in some cases; thus, a process for producing the aqueous pigment dispersion of the present invention preferably does not include the above-mentioned solvent salt milling.

Examples of the anionic group-containing organic polymeric compound usable in the present invention include (meth)acrylic acid ester resins, polyester resins, and polyurethane resins. These polymeric compounds may be used alone or in combination of two or more thereof.

The term "(meth)acrylic acid ester resins" refers to products synthesized by polymerization using acrylic acid esters or methacrylic acid esters as an essential component. The term "(meth)acrylic acid esters" herein collectively refers to both acrylic acid esters and methacrylic acid esters. In the present invention, a (meth)acrylic acid ester resin preferably contains an anionic group in its structure for stable dispersion of the (meth)acrylic acid ester resin in an aqueous medium.

Examples of such an anionic group-containing (meth)acrylic acid ester resin include copolymer resins produced by copolymerizing at least one selected from ethylenically unsaturated monomers containing anionic groups, such as a carboxyl group, a sulfonate group, a phosphate group, and a thiocarboxyl group, with a (meth)acrylic ester and optionally another ethylenically unsaturated monomer copolymerizable therewith.

In view of the availability and price of a raw material monomer, a copolymer resin containing a carboxyl group or a sulfonate group is preferably employed, and a (meth)acrylic acid ester resin containing a carboxyl group is more preferably used because coexistence of an electrically neutral state and an anionic state can be controlled under broad conditions. The most preferable (meth)acrylic acid ester resin is a (meth)acrylic acid ester resin containing both a carboxyl group and a salt of a carboxyl group as anionic groups.

Examples of carboxyl group-containing ethylenically unsaturated monomers include unsaturated carboxylic acids such as acrylic acid, methacrylic acid, maleic acid, fumaric acid, crotonic acid, itaconic acid, and 4-vinylbenzoic acid; and unsaturated esters of polybasic acids, such as vinyl succinate, allyl maleate, vinyl terephthalate, and allyl trimellitate. Examples of sulfonate group-containing monomers include sulphonated alkyl or allylic esters of unsaturated carboxylic acids, such as 2-sulfoethyl acrylate and 4-sulphophenyl methacrylate; unsaturated esters of sulfo carboxylic acids, such as vinly sulfosuccinate; and sulfostyrenes such as styrene-4-sulfonic acid.

Examples of (meth)acrylic acid esters include methyl (meth)acrylate, n-butyl (meth)acrylate, 2-ethylhexyl (meth)acrylate, n-octyl (meth)acrylate, dodecyl (meth)acrylate, octadecyl (meth)acrylate, cyclohexyl (meth)acrylate, isobornyl (meth)acrylate, and benzyl (meth)acrylate.

Examples of other ethylenically unsaturated monomers that is copolymerizable include unsaturated fatty acid esters such as dimethyl maleate, dimethyl fumarate, 2-hydroxyethyl (meth)acrylate, and 2-aminoethyl (meth)acrylate; unsaturated fatty acid amides such as (meth)acrylamide and N-methyl(meth)acrylamide; unsaturated nitriles such as (meth)acrylonitrile; unsaturated ethers such as vinyl acetate and vinyl propionate; styrenes such as styrene, α-methylstyrene, o-methylstyrene, m-methylstyrene, p-methylstyrene, p-t-butylstyrene, 4-methoxystyrene, and 4-chlorostyrene; unsaturated hydrocarbons such as ethylene, propylene, 1-butene, 1-octene, vinylcyclohexane, and 4-vinylcyclohexene; unsaturated halogenated hydrocarbons such as vinyl chloride, vinylidene chloride, tetrafluoroethylene, and 3-chloropropylene; vinyl-substituted heterocyclic compounds such as 4-vinylpyridine, N-vinylcarbazole, and N-vinylpyrrolidone; products obtained by reaction of monomers selected from the above-mentioned monomers and containing substituents having active hydrogen, such as a carboxyl group, a hydroxyl group, and an amino group with epoxides such as ethylene oxide, propylene oxide, and cyclohexane oxide; and a products obtained by reaction of substituent-containing monomers selected from the above-mentioned monomers and containing, for instance, a hydroxyl group and an amino group with carboxylic acids such as acetic acid, propionic acid, butanoic acid, hexanoic acid, decanoic acid, and dodecanoic acid.

In the present invention, the anionic group-containing organic polymeric compound preferably contains a (meth)acrylic acid ester resin and a polyurethane resin which will be described later.

A styrene-(meth)acrylic acid ester copolymer resin containing a styrene as a polymer unit is preferably employed as the above-mentioned (meth)acrylic acid ester resin because such a copolymer resin can be used in combination with the urethane resin (described below) to provide better effects on the density and scratch resistance of color images. In particular, such a styrene-(meth)acrylic acid ester copolymer resin is preferably used in combination with a preferred aliphatic or alicyclic polyether-based polyurethane resin which will be described later.

In the present invention, for example, the carboxyl group-containing (meth)acrylic acid ester resins may or may not have a crosslinked moiety. Such a resin having a crosslinked moiety, as compared with a resin having no crosslinked moiety, exhibits excellent thermal resistance, and an aqueous ink containing such a resin is suitable for image recording with an ink jet recording apparatus utilizing thermal-type ink ejection in which ink droplets are heated and then ejected (described later).

The resin having a crosslinked moiety can be produced as follows: the above-mentioned monomer is copolymerized with an ethylenically unsaturated monomer containing a glycidyl group, such as 2,3-epoxypropyl (meth)acrylate, to produce a crosslinkable resin, and then the crosslinkable resin is crosslinked optionally by using a curing accelerator in any step in production of the aqueous pigment dispersion.

In order to impart low viscosity to a dispersion, cause good dispersion stability to be exhibited, and allow stable printing to be readily performed for a long period with an ink jet recording aqueous ink containing the aqueous pigment dispersion, the weight-average molecular weight of the (meth)acrylic acid ester resin used in the present invention is preferably in the range of 2,000 to 100,000, and especially preferably 5,000 to 50,000.

The acid value and glass transition point of the (meth)acrylic acid ester resin used in the present invention is preferably 30 to 220 mgKOH/g and −20 to 100° C., and more preferably 80 to 220 mgKOH/g and 0 to 90° C., respectively, which enables a dispersion to exhibit good dispersibility and dispersion stability, imparts good printing stability to the ink jet recording aqueous ink containing the aqueous pigment dispersion, and enables images to exhibit good water resistance as well as image storage properties such as scratch resistance and resistance to color migration.

At least some of the anionic groups contained in the (meth)acrylic acid ester resin in the aqueous pigment dispersion of the present invention are preferably ionized by a basic substance to develop dispersibility and dispersion stability. The optimum proportion of the anionic group subjected to ionization is normally in the range of 30 to 100%, and preferably 40 to 60%. This proportion of the anionic group subjected to ionization does not indicate a molar ratio of the anionic group to a basic substance but is determined in view of dissociation equilibrium. In the case where the anionic group is a carboxyl group, for example, even when the stoichiometrically equivalent amount of a strongly basic substance is used, the proportion of an ionized group (carboxylate group) is less than 100% due to dissociation equilibrium, and a carboxylate group and a carboxyl group coexist.

Known neutralizers (basic substances) can be employed to ionize at least some of the anionic groups contained in the (meth)acrylic acid ester resin in this manner. Any material which will be descried as examples of a neutralizer used for a polyurethane resin can be employed.

The (meth)acrylic acid ester resin used in the present invention more preferably has an average dispersed particle size larger than that of the polyurethane resin which will be described later. The average dispersed particle size is herein measured by dynamic light scattering (Doppler scattered light analysis) and represented in terms of a median diameter obtained with a laser Doppler particle size analyzer.

Although the proportion of the anionic group-containing organic polymeric compound to the total of the red pigment (A) and the derivative (B) is not specifically limited in the present invention, the non-volatile content of the anionic group-containing organic polymeric compound is normally from 10 to 100 parts, and preferably 20 to 60 parts relative to the total (100 parts) of the red pigment (A) and the derivative (B) on a mass basis.

The (meth)acrylic acid ester resin can be used alone as the anionic group-containing organic polymeric compound to reduce changes in a dispersed particle size and absorbance ratio before and after storage at high temperature for a long period and thus enhance storage stability; however, the (meth)acrylic acid ester resin can be used in combination with a polyurethane resin to greatly reduce such changes and therefore further enhance storage stability.

In the case where the aqueous pigment dispersion of the present invention contains both the (meth)acrylic acid ester resin and a polyurethane resin as the anionic group-containing organic polymeric compounds, the mass ratio of the (meth)acrylic acid ester resin to the polyurethane resin is preferably in the range of 30/70 to 70/30 on a non-volatile content basis, which can provide excellent storage stability.

The polyurethane resin used in the present invention essentially contains two or more urethane bonds per molecule. Such a polyurethane resin includes, for instance, a polyurethane-polyurea resin having a urea bond in addition to urethane bonds.

Polyurethane resins include polyester-based polyurethane resins and polyether-based polyurethane resins; polyether-based polyurethane resins are preferably employed because polyether diol moieties thereof are less likely to be hydrolyzed.

A polyurethane resin can be synthesized by, for example, a reaction of organic diisocyanate with a diol, each component being essential. Examples of such a diol include low-molecular-weight diols having a molecular weight of less than 800 and high-molecular-weight diols having a molecular weight of 800 or higher, such as a polyether diol, a polyester diol, a polyesterether diol, and a polycarbonate diol.

Such a polyurethane resin can be produced, for instance, through a chain elongation reaction of an isocyanate group-terminated prepolymer with a diamine compound containing a primary and/or secondary amino group or with a bifunctional compound containing groups that can react with an isocyanate group, such as the above-mentioned amino group and a hydroxyl group or the above-mentioned amino group and another active hydrogen functional group, (chain elongating agent) in water and/or an organic solvent, the isocyanate group-terminated prepolymer being produced through a reaction of a low or high-molecular-weight diol with organic diisocyanate with an excess of isocianate groups.

In the present invention, in order to stably disperse the polyurethane resin in an aqueous medium, the polyurethane resin preferably has an anionic group in its structure. The polyurethane resin containing an anionic group in its molecule can be produced by using an anionic group-containing chain elongating agent in the above-mentioned production technique of the polyurethane resin. Non-limiting examples of such a chain elongating agent to be used include active hydrogen compounds each containing a carboxyl group and/or a sulfonate group and two additional active hydrogen atoms, such as 2,2-dimethylollactic acid, 2,2-dimethylolpropionic acid, 2,2-dimethylolbutanoic acid, 2,2-dimethylolvaleric acid, 3,4-diaminobutanesulfonic acid, and 3,6-diamino-2-toluenesulfonic acid.

Examples of the organic polyisocyanate include aromatic diisocyanates, such as 2,4-tolylene diisocyanate, 2,6-tolylene diisocyanate, 4,4'-diphenyl methane diisocyanate, 2,4'-diphenyl methane diisocyanate, 2,2'-diphenyl methane diisocyanate, 1,5-naphthylene diisocyanate, 1,4-naphthylene diisocyanate, p-phenylene diisocyanate, m-phenylene diisocyanate, o-xylylene diisocyanate, m-xylylene diisocyanate, p-xylylene diisocyanate, tetramethylxylylene diisocyanate, 4,4'-diphenyl ether diisocyanate, 2-nitrodiphenyl-4,4'-diisocyanate, 2,2'-diphenylpropane-4,4'-diisocyanate, 3,3'-dimethyl diphenyl methane-4,4'-diisocyanate, 4,4'-diphenylpropane diisocyanate, and 3,3'-dimethoxydiphenyl-4,4'-diisocyanate; aliphatic diisocyanates, such as tetramethylene diisocyanate, hexamethylene diisocyanate, 2-methyl-1,5-pentane diisocyanate, 3-methyl-1,5-pentane diisocyanate, and lysine diisocyanate; alicyclic diisocyanates, such as isophorone diisocyanate, hydrogenated tolylene diisocyanate, hydrogenated diphenylmethane diisocyanate, hydrogenated xylylene diisocyanate, hydrogenated tetramethylxylylene diisocyanate, and cyclohexyl diisocyanate; and mixtures of two or more of these organic polyisocyanates.

Among these organic diisocyanates, aliphatic diisocyanates or alicyclic diisocyanates, such as hexamethylene diisocyanate, isophorone diisocyanate, and hydrogenated diphenylmethane diisocyanate, have excellent light resistance and little effect on coloration of films and are therefore especially preferably selected to produce an aliphatic diisocyanate-based or an alicyclic diisocyanate-based polyurethane resin.

Examples of the low-molecular-weight polyol include ethylene glycol, 1,2-propanediol, 1,3-propanediol, 1,2-butanediol, 1,3-butanediol, 1,4-butanediol, 1,5-pentanediol, 1,6-hexanediol, 2-methyl-1,5-pentanediol, 3-methyl-1,5-pentanediol, neopentyl glycol, 1,8-octanediol, 1,9-nonanediol, decamethylene glycol, diethylene glycol, dipropylene glycol, 2,2-diethyl-1,3-propanediol, 2-n-butyl-2-ethyl-1,3-propanediol, 2,2,4-trimetlryl-1,3-peiitanediol, 2-ethyl-1,3-hexanediol, 2-n-hexadecane-1,2-ethylene glycol, 2-n-eicosane-1,2-ethylene glycol, 2-n-octacosane-1,2-ethylene glycol, cyclohexane-1,4-diol, cyclohexane-1,4-dimethanol, 3-hydroxy-2,2-dimethylpropyl-3-hydroxy-2,2-dimethylpropionate, dimer acid diol, bisphenol A, hydrogenated bisphenol A, ethylene oxide or propylene oxide adducts of bisphenol A, and ethylene oxide or propylene oxide adducts of hydrogenated bisphenol A.

Examples of the diamine compounds usable as a chain elongating agent include ammonia; aliphatic diamines such as ethylenediamine, hexamethylenediamine, isophorondiamine, diaminodiphenyl methane, diaminodiphenyl sulfone, diaminodicyclo hexylmethane, and tolylenediamine; alicyclic diamines; aromatic diamines; and dialkanolamines such as diethanolamine and dipropanolamine.

Examples of a neutralizer (referred to as basic substance, where appropriate) contained in the polyurethane resin to neutralize the anionic group include organic amines such as ammonia, ethylamine, trimethylamine, triethylamine, triisopropylamine, tributylamine, triethanolamine, N-methyldiethanolamine, N-phenyldiethanolamine, monoethanolamine, dimethylethanolamine, diethylethanolamine, morpholine, N-methylmorpholine, and 2-amino-2-ethyl-1-propanol; alkali metals such as lithium, potassium, and sodium; and inorganic alkali compounds such as sodium hydroxide and potassium hydroxide.

Preferred polyurethane resins usable in the present invention are linear thermoplastic polyurethane resins produced by only the reaction of an organic diisocyanate with a diol and optionally a bifunctional chain elongating agent, and such polyurethane resins exhibit excellent film properties and can be therefore easily treated. Among such polyurethane resins, anionic group-containing polyether-based polyurethane resins, in particular, a polyether-based polyurethane resin which is produced by using poly(oxytetramethylene)glycol as a diol and which has a poly(oxytetramethylene) structure exhibits excellent resistance to hydrolysis and is less likely to suffer from decreases in the adhesion and glossiness of color images on a recording medium even after being exposed to heat and moisture, as compared with polyether-based polyurethane resins produced by using other polyether diols such as polyethylene glycol and polypropylene glycol.

The polyurethane resin used in the present invention is preferably independently dispersible in aqueous media and has an average dispersed particle size of 1 to 45 nm. This average dispersed particle size can be measured as in the (meth)acrylic acid ester resin.

The average dispersed particle size of the polyurethane resin can be adjusted by, for example, changing the molecular weight of the polyurethane resin, the content of the anionic group, and the neutralization index of the anionic group. In the present invention, any commercially available aqueous dispersion of polyurethane resin having an average dispersed particle size of 1 to 45 nm can be used; the average dispersed particle size is more preferably 1 to 30 nm, and further preferably 1 to 20 nm.

The polyurethane resin used in the present invention may be in any form and is desirably dispersed in water (aqueous dispersion); the polyurethane resin may be dissolved or dispersed in a water-soluble organic solvent. In this case, an additional process for removing such an organic solvent is carried out. The polyurethane resin can be dissolved or dispersed in a water-soluble organic solvent usable in aqueous pigment recording liquids. In this case, an additional process for removing the organic solvent need not be performed.

The aqueous pigment dispersion of the present invention can be prepared by, for instance, preliminarily preparing aqueous pigment dispersions of the (meth)acrylic acid ester resin and polyurethane resin and mixing the red pigment (A) and the derivative (B) with these aqueous pigment dispersions for uniform dispersion.

The red pigment (A), the derivative (B), and particles of the (meth)acrylic acid ester resin and polyurethane resin corresponding to the anionic group-containing organic polymeric compounds may be each independently dispersed in the aqueous pigment dispersion of the present invention; however, the particles dispersed therein are preferably the mixture of composite particles in which both the red pigment (A) and derivative (B) are coated with the (meth)acrylic acid ester resin and the polyurethane resin particles. In aqueous pigment dispersions containing composite particles, the mixture of the composite particles, in which both the red pigment (A) and derivative (B) are coated with the (meth)acrylic acid ester resin, and the polyurethane resin particles can sufficiently develop effects on pigment dispersibility and scratch resistance and is thus preferably employed, as compared with the mixture of the composite particles, in which both the red pigment (A) and derivative (B) are coated with the polyurethane resin, and the (meth)acrylic acid ester resin particles.

In the aqueous pigment dispersion of the present invention, the particles (dispersed particles) are preferably dispersed in an aqueous medium so as to have an average dispersed particle size of 50 to 200 nm. In the optimum aqueous pigment dispersion of the present invention which contains dispersed particles in the form of the mixture of the composite particles, in which both the red pigment (A) and derivative (B) are coated with the (meth)acrylic acid ester resin, and the polyurethane resin particles, the average dispersed particle size of the composite particles alone is preferably larger than that of the polyurethane resin particles alone, which enables development of excellent scratch resistance.

In the present invention, it is preferred that the polyurethane resin be not chemically bonded to the (meth)acrylic acid ester resin particles themselves or the (meth)acrylic acid ester resin particles contained in the composite particles to impart more excellent scratch resistance to color films.

The aqueous pigment dispersion containing the (meth)acrylic acid ester resin particles or composite particles used in the present invention can be produced, for instance, by the following methods (1) to (4):

(1) a method for producing an aqueous pigment dispersion, in which both the red pigment (A) and the derivative (B) are forced to be mechanically dispersed in an aqueous dispersion of the (meth)acrylic acid ester resin particles;

(2) a method for producing an aqueous pigment dispersion, in which the above-mentioned monomers are polymerized and optionally associated with each other by using a dispersant in water in the presence of both the red pigment (A) and the derivative (B);

(3) a method for producing an aqueous pigment dispersion containing microcapsule composite particles in which pigments are coated with the (meth)acrylic acid ester resin particles, in which the mixture of both the red pigment (A) and the derivative (B), the (meth)acrylic acid ester resin, and an organic solvent is gradually shifted from an oil phase to an aqueous phase with the aid of water and a basic substance and then desolvated to form the microcapsule composite particles; and (4) a method for producing an aqueous pigment dispersion containing microcapsule composite particles in which pigments are coated with the (meth)acrylic acid ester resin, in which the uniform mixture of both the red pigment (A) and the derivative (B), the (meth)acrylic acid ester resin, a basic substance, an organic solvent, and water is desolvated, acid is added thereto for acid deposition, the deposit is washed, and then the resulting deposit is dispersed in an aqueous medium together with a basic substance to form the microcapsule composite particles.

It is preferred that any of the above-mentioned methods for producing the aqueous pigment dispersion of the present invention essentially include a process of dispersing the mixture of the red pigment (A), the derivative (B), the (meth)acrylic acid ester resin, the basic substance, and water. Such a mixture preferably contains a water-soluble organic solvent. In particular, a process of dispersing a mixture containing at least the pigment, the (meth)acrylic acid ester resin, a basic substance, an water-soluble organic solvent, and water (dispersion process) is preferably carried out.

A water-soluble organic solvent can be also used in the dispersion process, which can decrease liquid viscosity in the dispersion process in some cases. Examples of the water-soluble organic solvent include ketones such as the acetone, methyl ethyl ketone, methyl butyl ketone, and methyl isobutyl ketone; alcohols such as methanol, ethanol, 2-propanol, 2-methyl-1-propanol, 1-butanol, and 2-methoxyethanol; ethers such as tetrahydrofuran, 1,4-dioxane, and 1,2-dimethoxyethane; and amides such as dimethylformamide and N-methylpyrrolidone, and it is particularly preferred that a compound selected from the group consisting of ketones having 3 to 6 carbon atoms and alcohols having 1 to 5 carbon atoms be used. These water-soluble organic solvents may be used in the form of a solution of the (meth)acrylic acid ester resin or may be separately added to the dispersion mixture.

Known apparatuses utilizing a variety of techniques can be used as a dispersing machine in the dispersion process. Examples of dispersion techniques include, but are not limited to, a technique utilizing the kinetic energy of a spherical dispersion medium formed from, for example, steel, stainless steel, zirconia, alumina, silicon nitride, or glass and having a diameter of approximately 0.1 to 10 mm; a technique utilizing a shearing force generated by mechanical stirring; and a technique utilizing a force generated by changes in the pressure and flow channel of the flux of a dispersion materials supplied at high speed or by collision thereof.

In the aqueous dispersion of the present invention, both the red pigment (A) and the derivative (B) are preferably dispersed in an aqueous medium in the form of particles coated with the (meth)acrylic acid ester resin (namely, above-mentioned microcapsule composite particles) to provide more excellent advantages in terms of each of ultimate dispersion level, time required for dispersion, and dispersion stability.

In order to form such a state, in a state in which both the red pigment (A) and the derivative (B) are dispersed in a liquid medium containing the (meth)acrylic acid ester resin, a process for coating the surfaces of both the red pigment (A) and the derivative (B) with the dissolved (meth)acrylic acid ester resin is preferably carried out after the above-mentioned dispersion process.

A preferred process for coating the surfaces of both the red pigment (A) and the derivative (B) with the dissolved (meth)acrylic acid ester resin is a process for depositing the (meth)acrylic acid ester resin dissolved in an aqueous basic substance solution by the acidification of the solution (acid deposition process).

Examples of a distillation process include a process for removing an organic solvent used in the dispersion process and a process for removing excessive water content to attain a desired solid content concentration.

In an example of the acid deposition process, an acid such as hydrochloric acid, sulfuric acid, or acetic acid is added to an aqueous dispersion obtained in the dispersion process for acidification to form a base and a salt, thereby depositing the dissolved (meth)acrylic acid ester resin on the surfaces of both the red pigment (A) and the derivative (B). This process can enhance the interaction between the pigments and the (meth)acrylic acid ester resin. The microcapsule composite particles can be therefore dispersed in an aqueous dispersion medium as described above; the aqueous dispersion can provide more excellent advantages in terms of physical properties, such as ultimate dispersion level and dispersion stability, and practicability such as solvent resistance.

A filtration process, for instance, involves filtering the solid content after the acid deposition process through, e.g., a filter press, a Nutsche type filter, or a pressure filter. A redispersion process, for example, involves adding a basic substance and optionally water and an additive to the solid content obtained through the acid deposition process and the filtration process to form a liquid dispersion again. Hence, a counter ion of the ionized anionic group contained in the (meth)acrylic acid ester resin can be changed from that used in the dispersion process.

It is preferred that the (meth)acrylic acid ester resin be not chemically bonded to the polyurethane resin in the present invention as descried above; it is more preferred that the both resins be not also physically bonded to each other. From this viewpoint, the optimum method involves dissolving the (meth)acrylic acid ester resin in the absence of the polyurethane resin and then adding the polyurethane resin to the aqueous pigment dispersion after the acid deposition process, the aqueous pigment dispersion containing the composite particles in which both the red pigment (A) and the derivative (B) are coated with the anionic group-containing (meth) acrylic acid ester resin. This enables formation of a color resin film in which the composite particles are surrounded by the polyurethane resin particles smaller in size, and scratch resistance of the color film can be most effectively enhanced while the light resistance thereof is maintained.

The polyurethane resin is added to the aqueous pigment dispersion containing the mixture of the diketopyrrolopyrrole-based red pigment (A) particles, the phthalimidoalkylated quinacridone (B) particles, and the anionic group-containing (meth)acrylic acid ester resin particles or containing the composite particles in which the diketopyrrolopyrrole-based red pigment (A) and the phthalimidoalkylated quinacridone (B) are coated with the anionic group-containing (meth)acrylic acid ester resin, and then the product is uniformly stirred for mixing, so that the aqueous pigment dispersion of the present invention can be produced. Known apparatuses utilizing a variety of techniques described above can be used for the uniform stir for mixing.

The proportion of the polyurethane resin to the total of the red pigment (A) and the derivative (B) is not specifically limited, and the polyurethane resin content based on the mass of the non-volatile content thereof can be selected from the range of 80 to 120 parts relative to 100 parts of the total of the red pigment (A) and the derivative (B). Since an ink jet recording aqueous ink desirably has low viscosity as much as possible to maintain ejection characteristics, the polyurethane resin content is preferably selected from the above-mentioned range to adjust the viscosity of the aqueous pigment dispersion to be low.

Examples of the aqueous organic solvents usable for the aqueous pigment recording liquid include aprotic organic solvents exhibiting water solubility, such as alcohols (e.g., ethylene glycol, diethylene glycol, triethylene glycol, polyethylene glycol, and glycerin); alkyl ethers, aryl ethers, and esters of these alcohols; and dimethylformamide (DMF), dimethyl sulfoxide (DMSO), pyrrolidone, and 2-methylpyrrolidone. These organic solvents used for the aqueous pigment recording liquid are selected on the basis of the type of a recording head, and the amount thereof is limited; thus, although such organic solvents can be used as an organic solvent for the polyurethane resin, water is desirably used as a dissolving medium or a dispersion medium.

The aqueous pigment dispersion of the present invention produced in this manner can be used for a variety of coloring applications, such as aqueous inks and aqueous paints, to form color films having high color density and excellent scratch resistance on a recording medium.

The aqueous pigment dispersion of the present invention is diluted such that the total of the red pigment (A) content and the derivative (B) content is from 1 to 8% on a mass basis, thereby yielding an aqueous pigment recording liquid. If the dispersed pigment content of the aqueous pigment dispersion is larger than described above, water or a water-soluble organic solvent is appropriately added to the aqueous pigment dispersion to adjust the dispersed pigment content to be a predetermined range; in addition, various additives, such as a humectant or a fungicide, necessary for preparation of aqueous ink can be used in combination. The produced aqueous pigment recording liquid is optionally filtered through a micro filter to yield an aqueous pigment recording liquid which is suitable for ink jet recording and which is highly less likely to cause, for instance, nozzle clogging.

Examples of recording media used for the aqueous pigment dispersion of the present invention and the aqueous pigment recording liquid include known recording media such as plain paper, resin-coated paper, and synthetic resin films. In particular, the aqueous pigment dispersion of the present invention and the aqueous pigment recording liquid are preferably used for surface-treated recording media that are swollen recording media each having a structure in which color images are fixed by swelling a surface-treated layer with ink droplets landed on the surface-treated layer.

The composition of the ink jet recording aqueous ink of the present invention can be appropriately changed on the basis of an ejection technique, which enables production of an aqueous pigment recording liquid usable for piezoelectric or thermal recording.

EXAMPLES

The present invention will now be described further in detail with reference to Examples. The terms "part" and "%" are on a mass basis in Specification unless otherwise specified. Table 1 shows compositions of coating films and results of evaluation in Examples and Comparative Examples.

Experimental Example 1

Synthesis of (Meth)acrylic Acid Ester Resin

Into a reactor of an automatic polymerization reaction apparatus (polymerization tester DSL-2AS manufactured by TODOROKI SANGYO CO., LTD.), 1,200 parts of isopropyl alcohol was supplied, the reactor having a stirrer, a dropping device, a temperature sensor, and a reflux device having a nitrogen-introducing device provided to the upper part thereof. The interior of the reactor was purged with nitrogen while the content was stirred. The temperature was increased to 80° C. in a state in which the interior of the reactor was maintained in the nitrogen atmosphere, and a mixture liquid of 75.0 parts of 2-hydroxyethyl methacrylate, 260.8 parts of methacrylic acid, 400.0 parts of styrene, 234.2 parts of benzyl methacrylate, 30.0 parts of glycidyl methacrylate, and 80.0 parts of "PERBUTYL (registered trademark) O" (active ingredient: t-butyl peroxy-2-ethylhexanonate, manufactured by NOF CORPORATION) was added dropwise over four hours with the dropping device. After completion of the addition of the mixture liquid, the reaction was further continued at the same temperature for 15 hours, and then part of IPA was distilled off under reduced pressure to adjust a non-volatile content to be 42.5%, thereby obtaining a solution of a (meth) acrylic acid ester resin having an acid value of 170.

(Synthesis of Anionic Group-containing Polyether-Based Polyurethane Resin)

Into a four-necked flask having a thermometer, a stirrer, a nitrogen-introducing tube, and a cooling tube, 480 parts of poly(oxytetramethylene) glycol having a number-average molecular weight of 2,000 (n=27.5, PTMG2000), 282 parts of isophorone diisocyanate (IPDI), and 0.007 parts of dibutyltin dilaurate (DBTDL) were supplied, and the mixture was allowed to react under a nitrogen atmosphere at 100° C. for an hour. Then, the temperature was decreased to 65° C. or lower, and 118.0 parts of dimethylolpropionic acid (DMPA) and 447.8 parts of neopentyl glycol (NPG) and methyl ethyl ketone (MEK) were added. Reaction was performed at 80° C. over 16 hours, and then methanol and 408.1 parts of MEK were added to terminate the reaction, thereby yielding an MEK solution of an acid group-containing linear polyether-based polyurethane resin (non-volatile content: 50%) having an acid value of 55 and a weight-average molecular weight of 33,000 on a polystyrene basis. The polyether-based polyurethane resin contained a 54% of poly(oxytetramethylene)

structure and also contained a polyaddition reaction structure of NPG (low-molecular-weight diol having a branched structure) and IPDI.

In a 3-liter stainless steel container, 1000 g of an MEK solution of polyurethane, 550 g of a 5% potassium hydroxide aqueous solution, and 1200 g of ion exchanged water were mixed and stirred for an hour. Then, the mixture liquid was transferred into a 3-liter separable round-bottom flask, and the whole of MEK and part of water were distilled off. The temperature was decreased to room temperature, and then the concentration was adjusted with ion exchanged water, thereby obtaining a polyurethane aqueous solution having a solid content of 19.6%.

(Preparation of Aqueous Pigment Dispersion)
<Aqueous Pigment Dispersion A>
IRGAZIN DPP RED BTP 352.8 Parts
Phthalimidomethylated-3,10-dichloroquinacridone 7.2 parts
Above-mentioned solution of (meth)acrylic acid ester resin 169.4 parts
25% potassium hydroxide aqueous solution 60.8 parts
Isopropyl alcohol 82.6 parts
Ion exchanged water 870.1 parts IRGAZIN DPP RED BTP was C. I. Pigment Red 254 manufactured by Ciba Specialty Chemicals.

The above components were compounded and mixed by using an emulsifying apparatus (IKA (registered trademark) LABOR-PILOT DR2000/4 manufactured by IKA-WERKE GMBH & CO. KG). To the mixture liquid, 183.0 parts of ion exchanged water was added; then, the mixture was processed through a dispersion apparatus (SC mill, type SC100/32, manufactured by Mitsui Mining Co., Ltd.) filled with zirconia beads each having a diameter of 0.3 mm and dispersed for 2.5 hours by a circulation mode (a mode of returning the liquid dispersion having been discharged from the dispersion apparatus to the mixing tank). Cold water was allowed to pass through a cooling jacket during the dispersion process to adjust the liquid dispersion temperature to be 30° C. or lower.

After completion of the dispersion, a stock dispersion was taken from the mixing tank. Then, the mixing tank and a channel of the dispersion apparatus were washed with 1,500 parts of water, and this water was subsequently mixed with the stock dispersion to obtain a diluted liquid dispersion.

The diluted liquid dispersion was put into a glass distillation apparatus, and the whole of isopropyl alcohol and part of water were distilled off. The product was left to stand for cooling to room temperature, and then 2% hydrochloric acid was added dropwise while the product was stirred, thereby adjusting the pH to be 3.5. Then, the solid was filtered with a Nutsche type filter and washed with water. A wet cake was collected into a container, a 25% potassium hydroxide aqueous solution was then added to adjust the pH to be 9.0, and the mixture was subsequently redispersed with a disper (TK. HOMO DISPER Model 20, manufactured by Primix Corporation). Then, the product was subjected to a centrifugation process (6000 G, 30 minutes), and ion exchanged water was further added thereto to yield an aqueous pigment dispersion A having a non-volatile content of 21.6%.

This aqueous pigment dispersion was an aqueous pigment dispersion containing composite particles in which both C. I. Pigment Red 254 and phthalimidomethylated-3,10-dichloroquinacridone were coated with (meth)acrylic acid ester resin.

The above-mentioned aqueous pigment dispersion was used to produce a final aqueous pigment dispersion A2 as described below, in which the content of the above-mentioned aqueous pigment dispersion was 10.0 parts in terms of the total of C. I. Pigment Red 254 and phthalimidomethylated-3,10-dichloroquinacridone. In the produced aqueous pigment dispersion, the ratio of absorbance at a wavelength of 510 nm to absorbance at a wavelength of 555 nm was 1.382.

<Final Aqueous Pigment Dispersion>
Above-mentioned aqueous pigment dispersion A2 amount equivalent to 10.0 parts
in terms of the total of (A)+(B)
Above-mentioned aqueous polyurethane resin solution 15.3 parts
Proxel GLX(s) (manufactured by Arch Chemicals, Inc., preservative) 0.2 parts
Ion exchanged water balance (Preparation of Ink)
An ink jet recording aqueous ink was prepared so as to have the ink composition described below. An ink immediately after the preparation and an ink stored in a thermostatic oven at 70° C. for five days were each used to measure the median size (50% particle size) of particles dispersed in the ink, a ratio of absorbance at a wavelength of 555 nm to absorbance at a wavelength of 510 nm (Abs. ratio, 555 nm/510 nm), and the hue (E*ab) of a color image.

<Composition of Ink Jet Recording Aqueous Ink>
Final aqueous pigment dispersion amount equivalent to 4.0 parts
in terms of the total of (A)+(B)
Tetraethylene glycol monobutyl ether 5.0 parts
Surfynol 465 (manufactured by Air Products Japan, Inc.) 1.0 part
Glycerin 12.5 parts
Ion exchanged water balance (Evaluation of Change in Particle Size)
The inks before and after being stored were analyzed with a laser Doppler particle size analyzer (Microtrac UPA150 manufactured by Leeds & Northrup) to determine a Δ50% particle size relative to the 50% particle size of the ink before storage.

(Evaluation of Crystal Growth of Pigment)
The inks before and after being stored were analyzed with a spectrophotometer (Spectrophotometer U-2010 manufactured by Hitachi, Ltd.) to determine a ΔAbs. ratio relative to the Abs. ratio of the ink before storage (555 nm/510 nm).

TEM images of the inks before and after storage and a result of the measurement of an Abs. ratio showed validity for evaluating crystal growth on the basis of an Abs. ratio. Furthermore, powder X-Ray diffraction measurement (powder pigment composition was obtained by acid deposition and washing of inks before and after storage) was carried out, which showed that crystal transformation had not been caused (an increase in an Abs. ratio was not caused by crystal transformation).

(Evaluation of Hue Change)
Each of the inks before and after being stored was put into an ink cartridge of a commercially available ink jet printer (EM-930C manufactured by Seiko Epson Corporation). Photo paper (GL-101 manufactured by Canon Inc.) was used as a medium to perform printing at 100% Duty. The resulting printed article was subjected to colorimetry with a spectrophotometer (SPECTRA FLASH SF600 PLUS CT manufactured by dator color international) to determine color difference (ΔE*ab) relative to a printed article formed with the ink before storage.

Experimental Examples 2 to 4

The C. I. Pigment Red 254 content and the phthalimidomethylated-3,10-dichloroquinacridone content were changed while the total amount thereof was fixed to 13.0 parts. Except that point, as in Experimental Example 1, final aqueous pigment dispersions were prepared, ink jet recording aqueous inks were prepared, and the properties thereof were evaluated.

In each of Experimental Examples 1 to 4, the phthalimidomethylated-3,10-dichloroquinacridone content was adjusted to be in the range of 1.5 to 4.0% relative to the total amount of C. I. Pigment Red 254 and phthalimidomethylated-3,10-dichloroquinacridone.

Table 1 shows the evaluation results.

TABLE 1

| | Derivative (B) content (%) | Change in dispersed particle size Δ50% particle size (nm) | Change in absorbance ratio ΔAbs. ratio | Color difference ΔE * ab |
|---|---|---|---|---|
| Experimental Example 1 (Comparative Example) | 1.5 | 10.8 | 0.033 | 3.8 |
| Experimental Example 2 | 2.0 | 2.9 | 0.023 | 0.8 |
| Experimental Example 3 | 3.0 | 13.0 | 0.013 | 0.9 |
| Experimental Example 4 (Comparative Example) | 4.0 | 35.9 | 0.013 | 2.4 |

A final aqueous pigment dispersion was prepared as in Experimental Example 1 except that the derivative (B) content was 1.8%, and an ink jet recording aqueous ink was similarly prepared (Example 5). A change in an absorbance ratio and a hue change were better in such an ink jet recording aqueous ink than in Experimental Example 1 while being not so much as in Experimental Example 2.

A final aqueous pigment dispersion was prepared as in Experimental Example 1 except that the derivative (B) content was 3.5%, and an ink jet recording aqueous ink was similarly prepared (Example 6). A change in an absorbance ratio and a hue change were better in such an ink jet recording aqueous ink than in Experimental Example 4 while being not so much as in Experimental Example 3.

FIG. 1 is a graph illustrating color differences in the case where the derivative (B) contents were adjusted to be in the range of 1.5 to 4.0%. The horizontal axis indicates the derivative (B) content, and the vertical axis indicates a color difference. As is clear from FIG. 1, drastic hue changes were caused between the derivative (B) contents of 1.5% and 1.6% and between the derivative (B) contents of 3.8% and 4.0%. It is clear that there was a significance of critical range in the derivative (B) contents of 1.6% and 3.8% defined in the present invention.

As is clear from Table 1, in the case where the phthalimidoalkylated quinacridone (B) content is from 1.6 to 3.8% relative to the total (100%) of diketopyrrolopyrrole-based red pigment (A) and phthalimidoalkylated quinacridone (B) on a mass basis, a change in the size of dispersed particles due to granulation and changes in an absorbance ratio and hue due to crystal growth can be specifically reduced to a low level.

INDUSTRIAL APPLICABILITY

The present invention can provide an aqueous pigment dispersion used for preparing an ink jet recording aqueous ink of R (red) color that is an extra color (referred to as "additional color" where appropriate), the aqueous pigment dispersion being suitable for full color printing with at least four colors of Y (yellow), M (magenta), C (cyan), and R (red) and exhibiting excellent storage stability. The present invention can also provide an ink jet recording aqueous ink.

The invention claimed is:

1. An aqueous pigment dispersion used for preparing an ink jet recording aqueous ink, the aqueous pigment dispersion comprising: an anionic group-containing organic polymeric compound; an organic pigment; an organic pigment derivative; and water, wherein the polymeric compound, the organic pigment, and the organic pigment derivative are dispersed in the water, the organic pigment and the organic pigment derivative are a diketopyrrolopyrrole-based red pigment (A) and a phthalimidoalkylatedquinacridone (B), respectively, and the phthalimidoalkylatedquinacridone (B) content is in the range of 1.6 to 3.8% relative to the total (100%) of the diketopyrrolopyrrole-based red pigment (A) and the phthalimidoalkylatedquinacridone (B) on a mass basis.

2. The aqueous pigment dispersion according to claim 1, wherein a (meth)acrylic acid ester resin and a polyurethane resin are used as the anionic group-containing organic polymeric compound.

3. The aqueous pigment dispersion according to claim 2, wherein a mass ratio of the (meth)acrylic acid ester resin to the polyurethane resin is in the range of 30/70 to 70/30 on a non-volatile content basis.

4. The aqueous pigment dispersion according to claims 2 or 3, wherein the aqueous pigment dispersion contains a composite particle and a polyurethane resin particle, the composite particle containing the diketopyrrolopyrrole-based red pigment (A) and the phthalimidoalkylatedquinacridone (B) that are coated with the (meth)acrylic acid ester resin.

5. An ink jet recording aqueous ink comprising the aqueous pigment dispersion according to claim 4, wherein the aqueous pigment dispersion is diluted such that the total of the organic pigment content and the organic pigment derivative content is from 1 to 8% on a mass basis.

* * * * *